(12) United States Patent
Eum et al.

(10) Patent No.: US 6,509,997 B2
(45) Date of Patent: Jan. 21, 2003

(54) OPTICAL SCANNING APPARATUS

(75) Inventors: Jae-yong Eum, Gyeonggi-do (KR); Seung-tae Jung, Gyeonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/938,305

(22) Filed: Aug. 24, 2001

(65) Prior Publication Data

US 2002/0054414 A1 May 9, 2002

(30) Foreign Application Priority Data

Sep. 20, 2000 (KR) ........................................ 2000-55200

(51) Int. Cl.[7] .............................................. G02B 26/08
(52) U.S. Cl. ........................ 359/212; 359/198; 347/260
(58) Field of Search .................... 359/196, 205, 359/212, 197, 198, 234, 247; 347/260

(56) References Cited

U.S. PATENT DOCUMENTS 5,953,116 A * 9/1999 Ohtomo et al. .......... 33/366.23
6,248,989 B1 * 6/2001 Ohishi ........................ 250/205

* cited by examiner

Primary Examiner—Cassandra Spyrou
Assistant Examiner—Euncha Cherry
(74) Attorney, Agent, or Firm—Staas & Halsey LLP

(57) ABSTRACT

An optical scanning apparatus for performing scanning by focusing a beam scattered by a bubble which moves at a predetermined speed within a closed loop fluid pipe, thereby forming an image. The optical scanning apparatus includes a light source for emitting light; a closed loop fluid pipe; a fluid contained in the fluid pipe, transmitting the light emitted from the light source; at least one bubble contained in the fluid pipe, scattering incident light; a pump installed at one side of the fluid pipe, circulating the bubble at a predetermined speed; and an image formation lens focusing the light emitted by the light source and scattered by the at least one bubble to form an image on a predetermined scanning line. Accordingly, the volume of the optical scanning apparatus can be reduced, and the optical scanning apparatus can be easily manufactured. Consequently, productivity can be increased.

26 Claims, 4 Drawing Sheets

OPTICAL SCANNING APPARATUS

CROSS-REFERENCE TO RELATED APPLICATION

This application claims the benefit of Korean Application No. 2000-55200, filed on Sep. 20, 2000, in the Korean Industrial Property Office, the disclosure of which is incorporated herein by reference.

BACKGROUND OF THE INVENTION

1. Field of the Invention

The present invention relates to an optical scanning apparatus, and more particularly, to an optical scanning apparatus for scanning using a beam scattered by a bubble which moves at a predetermined speed within a fluid pipe.

2. Description of the Related Art

Optical scanning apparatuses are employed in printers and emit, for example, laser beams to scan a photosensitive medium, such as a photoreceptor belt, to form an electrostatic latent image. In particular, as demand for color printing increases, interest in employing scanning apparatuses in color printers has increased. Color laser printers typically include scanning apparatuses for four colors, i.e., yellow (Y), magenta (M), cyan (C) and black (BK), respectively.

Referring to FIG. 1, a conventional optical scanning apparatus includes a light source 100, a rotary polygon mirror 105 rotated by a motor (not shown) for reflecting light emitted from the light source 100, an f-θ lens 115 for allowing the light reflected by the rotary polygon mirror 105 to form appropriate spots on a scanning line 118 of a photosensitive medium, for example, a photoreceptor belt 110, and a reflecting mirror 120 disposed on an optical path between the f-θ lens 115 and the photoreceptor belt 110, for reflecting incident light so that the path of the light transmitted by the f-θ lens 115 is directed toward the scanning line 118 on the photoreceptor belt 110. A predetermined electrostatic latent image is formed on the photoreceptor belt 110 by turning the light source 100 on and off.

Meanwhile, a collimating lens 122 for converting incident light into parallel light and a cylindrical lens 135 for forming a linear image on the reflecting surface of the rotary polygon mirror 105 are disposed on the optical path between the light source 100 and the rotary polygon mirror 105. Reference numeral 125 denotes a sensor for detecting the position at which the scanning line 118 begins.

Here, light emitted from the light source 100 is converted into parallel light by the collimating lens 122. The parallel light is transmitted by the cylindrical lens 135 and then reflected by the rotary polygon mirror 105. The light reflected by the rotary polygon mirror 105 is transmitted by the f-θ lens 115 and redirected by the reflecting mirror 120 so that a spot is formed at a certain portion on the scanning line 118 of the photoreceptor belt 110.

As described above, a conventional optical scanning apparatus including the f-θ lens 115 and the rotary polygon mirror 105 has a complex structure and is quite large. In addition, f-θ lenses are mostly aspheric so that it is very difficult to manufacture the lenses and the lenses are very expensive. Since it is difficult to manufacture, the percentage of defects of products is high. This brings about a drop in color registration performance.

SUMMARY OF THE INVENTION

To solve the above problems, it is an objective of the present invention to provide an optical scanning apparatus in which a bubble circulates in a closed loop fluid pipe at a constant speed and in which scanning is performed using a beam scattered by the bubble, thereby reducing volume, facilitating manufacturing and decreasing manufacturing costs.

Additional objects and advantages of the invention will be set forth in part in the description which follows and, in part, will be obvious from the description, or may be learned by practice of the invention.

Accordingly, to achieve the above and other object of the invention, there is provided an optical scanning apparatus including a light source for emitting light; a closed loop fluid pipe; a fluid contained in the fluid pipe, transmitting the light emitted from the light source; at least one bubble contained in the fluid pipe, scattering the light emitted by the light source; a pump installed at one side of the fluid pipe, circulating the bubble at a predetermined speed; and an image formation lens focusing the light emitted by the light source and scattered by the at least one bubble to form an image on a predetermined scanning line.

BRIEF DESCRIPTION OF THE DRAWINGS

The above objective and advantages of the present invention will become more apparent by describing in detail preferred embodiments thereof with reference to the attached drawings in which.

DETAILED DESCRIPTION OF THE PREFERRED EMBODIMENTS

Figure 1:
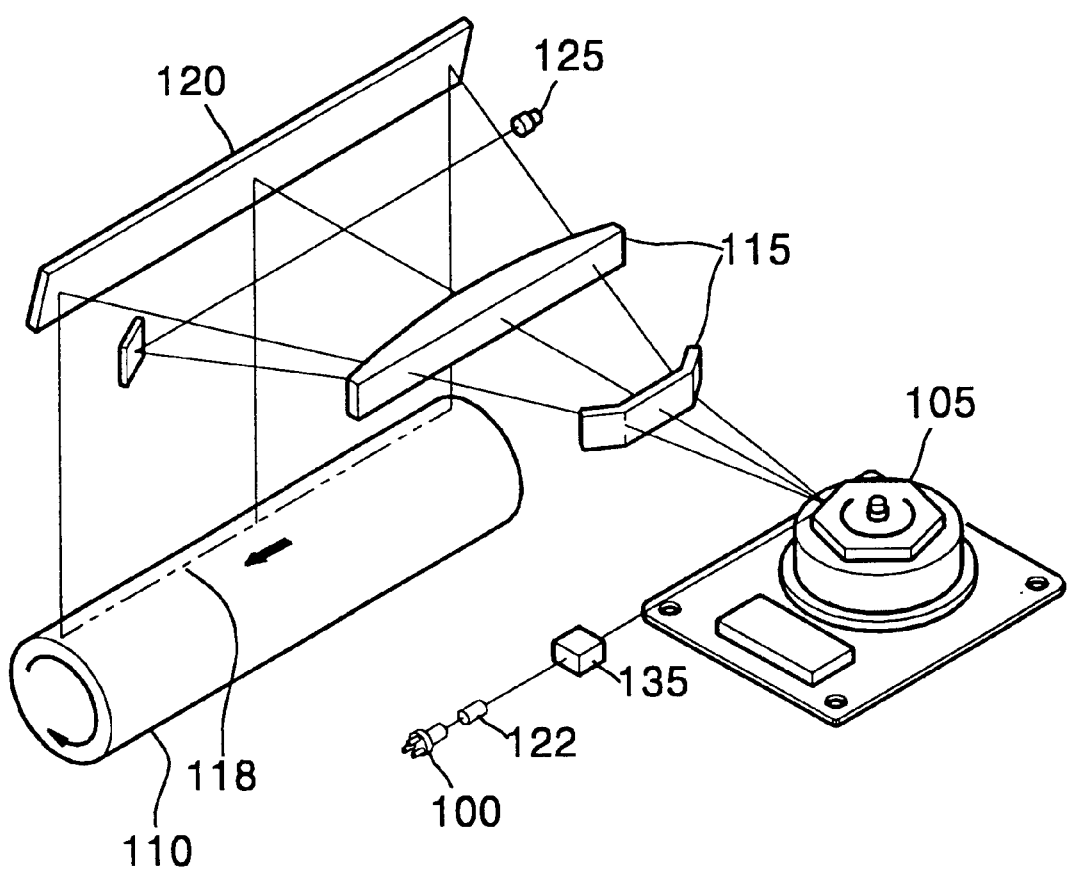
FIG. 1 is a diagram of a conventional optical scanning apparatus.

Reference will now be made in detail to preferred embodiments of the present invention, examples of which are illustrated in the accompanying drawings, wherein like reference numerals refer to the like elements throughout. The embodiments are described below in order to explain the present invention by referring to the figures.

Figure 2:
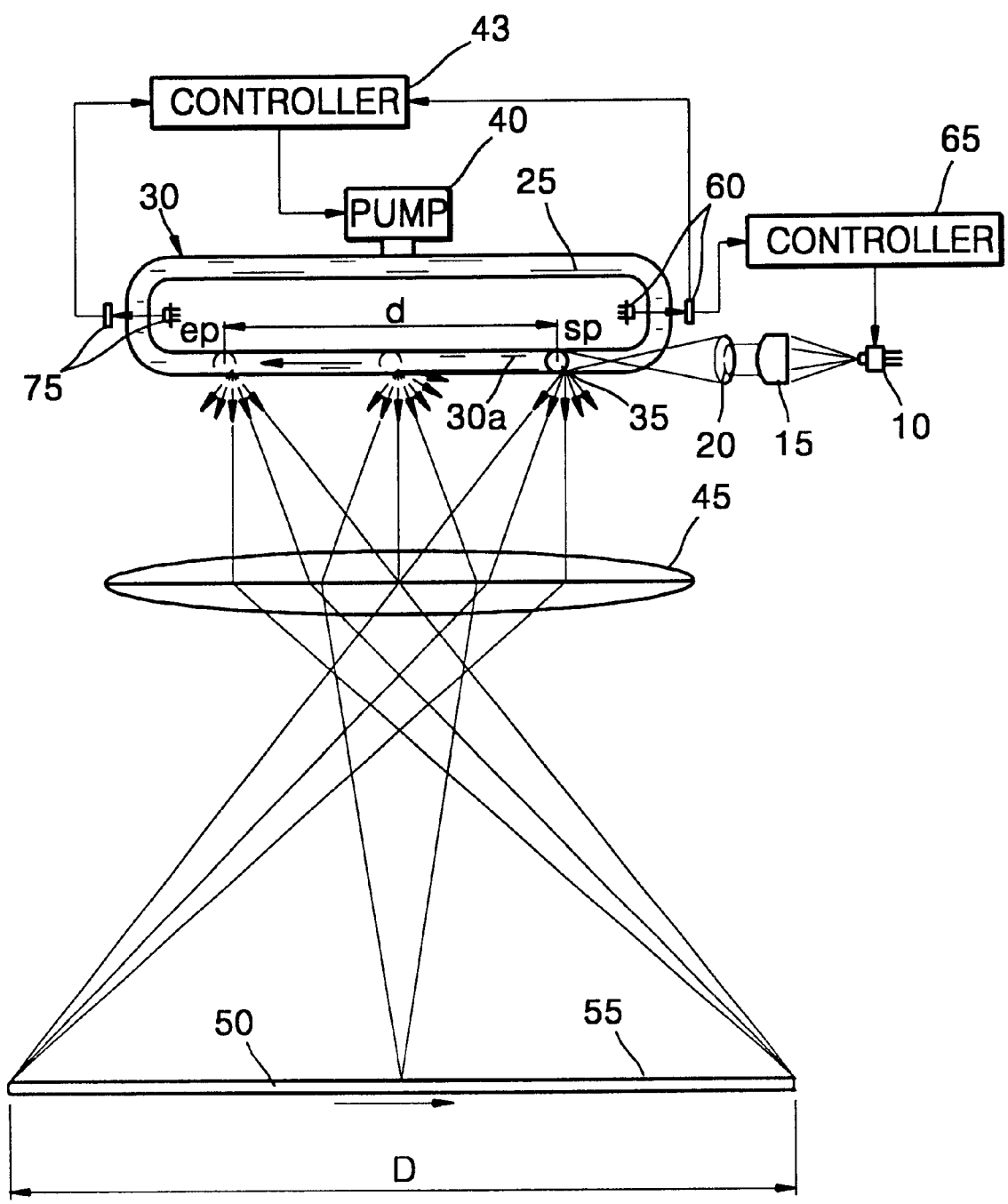
FIG. 2 is a schematic diagram of an optical scanning apparatus according to a first embodiment of the present invention.

Referring to FIG. 2, an optical scanning apparatus according to a first embodiment of the present invention includes a light source 10 for emitting light, a collimating lens 15 for converting light emitted from the light source 15 into parallel light, and a cylindrical lens 20 for focusing the parallel light from the collimating lens 15. The optical scanning apparatus also includes a closed loop fluid pipe 30 filled with a fluid 25. The fluid pipe 30 contains a bubble 35. A pump 40 for circulating the bubble 35 at a predetermined speed is installed around the fluid pipe 30. An image forming lens 45 is provided in front of the fluid pipe 30 to focus a beam scattered by the bubble 35 so that an image can be scanned on a photosensitive medium 50.

The pump 40 is controlled by a controller 43 to make the fluid 25 flow at a predetermined speed (represented by v). Accordingly, the bubble 35 moves along with the flow of the fluid 25. The fluid pipe 30 may be a circular pipe forming a loop so that the fluid 25 can circulate around the loop.

Herein, start and end points of scanning in the fluid pipe 30 are referred to as sp and ep, respectively, with the fluid pipe portion between the start point sp and the end point ep preferably being straight. This straight pipe portion is required to make a scanning line 55 appear straight on a photosensitive medium 50. Here, the fluid pipe portion between sp and ep is referred to as a corresponding line of scanning 30a, and the length of the corresponding line of scanning 30a is referred to as d. The length d is determined by the power of the image formation lens 45 and the length of the scanning line 55. When the power of the image formation lens 45 is represented by a, and the length of the scanning line 55 is represented by D, the following relationship is established:

$$d = \frac{D}{a}$$

For example, when the power of the image formation lens 45 is 10, the length d of the corresponding line of scanning 30a of the fluid pipe 30a is preferably set to 1/10 of D.

Meanwhile, it is necessary to detect the time at which the bubble 35 arrives at the scanning start point sp and the time at which the bubble arrives at the scanning end point ep in order to control the light source 10 to emit and stop emitting a beam at the appropriate times. Accordingly, a position detecting sensor 60 is installed immediately before the scanning start point sp to detect the time when the bubble 35 passes the position detecting sensor 60. The time when the bubble 35 arrives at the scanning start point sp can be calculated using the distance between the position detecting sensor 60 and the scanning start point sp and the speed of the bubble 35 based on the detected result. Since the length d of the corresponding line of scanning 30a is known, when the speed of the bubble 35 is represented by v the scanning end time can be calculated from d/v.

A controller 65 for controlling the light source 10 is also provided. Data detected by the position detecting sensor 60 is sent to the controller 65. Then, the controller 65 controls the light source 10 to emit and stop emitting a beam at certain times.

With such an arrangement, scanning starts. A scanning procedure will now be described with reference FIGS. 2 and 3. When a beam is scattered by the bubble 35, a bubble area influencing the scanning line 55 is referred to as an effective area A. A beam is reflected and scattered by the effective area A. The scattered beam passes through the image formation lens 45, and an image is formed on the photosensitive medium 50 in a reverse direction. Here, the size of a spot formed on the photosensitive medium 50 is closely related to the size of the beam. For example, when the power of the image formation lens 45 is 10 and the size of the beam is 5 μm, the size of a spot is about 50 μm. In addition, if the length D of the scanning line 55 is about 300 mm, the length d of the corresponding line of scanning 30a of the fluid pipe 30 should be about 30 mm. Further, when a scanning speed is represented by V, the speed v of the bubble 35 is set to 1/10 of the scanning speed V.

Figure 3:
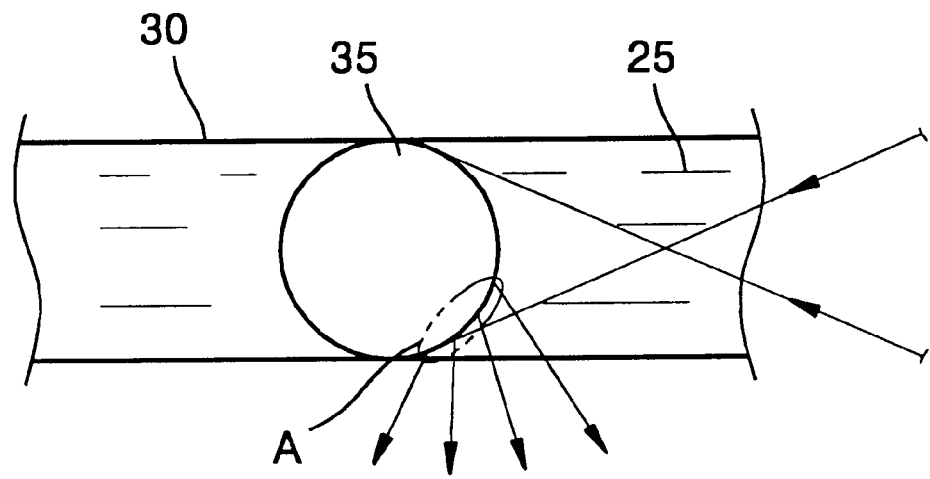
FIGS. 3 and 4 are diagrams of bubbles in an optical scanning apparatus according to the present invention.
Figure 4:
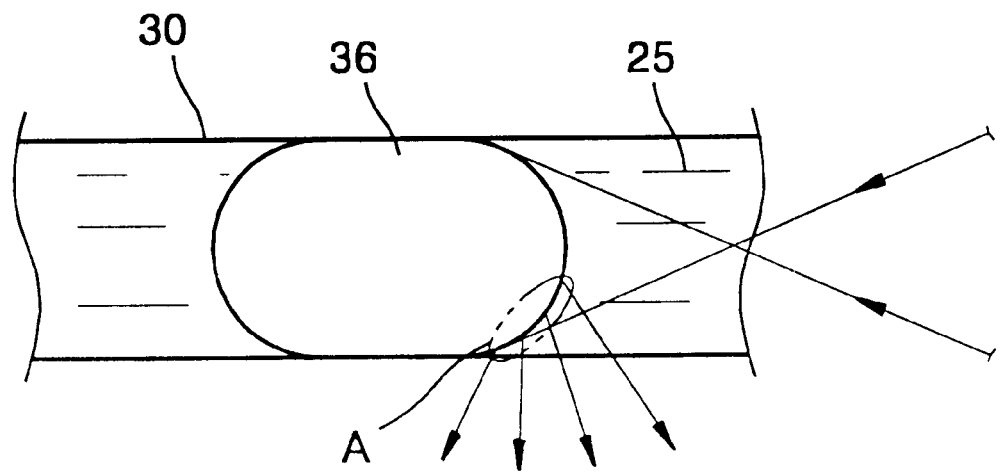

The speed v and the size of the bubble 35 can be controlled by the pump 40. As shown in FIGS. 3 and 4, the surface of the bubble 35 facing the light source is spherical in order to scatter incident light at a predetermined angle. The entire bubble 35 may be a sphere, as shown in FIG. 3, or an oblong bubble 36, as shown in FIG. 4, may be used. It is preferable that the bubble 35 closely contact the sidewall of the fluid pipe 30 in order to minimize transformation of the bubble 35 due to a flow rate while the bubble 35 is moving within the fluid pipe 30. However, even if the shape of the bubble 35 is changed, the effective area reflecting the beam does not change. Accordingly, deformation of the bubble 35 does not considerably influence scanning.

Since the distance between the cylindrical lens 20 and the bubble 35 changes while the bubble 35 moves, the quantity of light received by the bubble 35 changes. Accordingly, the controller 65 controls the quantity of light. Alternatively, a zoom lens (not shown) may be installed between the collimating lens 15 and the cylindrical lens 20 to regulate the quantity of light received by the bubble 35 by adjusting the focal distance of the cylindrical lens 20. In embodiments of the present invention, the distribution of light is uniform during scanning.

As illustrated in FIG. 2, a speed sensor 75 for measuring the moving speed v of the bubble 35 is also installed at a certain portion of the fluid pipe 30. The moving speed v of the bubble 35 measured by the speed sensor 75 is sent to the controller 43 of the pump 40. Then, the speed of the bubble is regulated whenever the bubble 35 fully circulates the fluid pipe 30 so that a scanning speed and scanning performance can be uniform. The bubble 35 may be a gas type such as an air bubble or a liquid or solid different from the fluid 25, for example.

Figure 5:
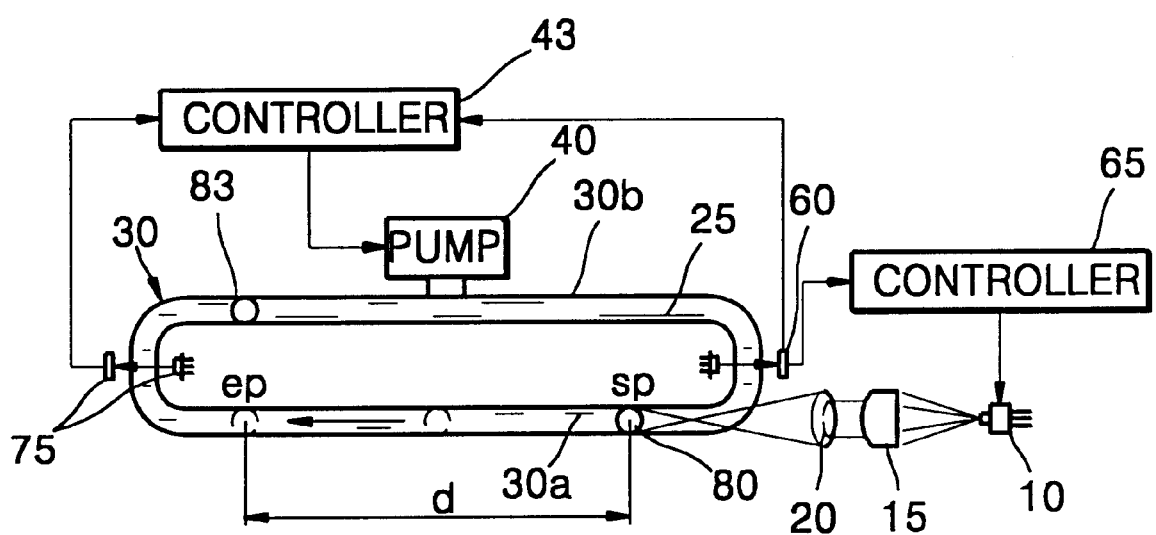
FIG. 5 is a diagram of a fluid pipe of an optical scanning apparatus according to a second embodiment of the present invention.

In FIG. 5, two bubbles, i.e., a first bubble 80 and a second bubble 83, are contained in a fluid pipe 30. When two bubbles are used, scanning can be performed two times faster than scanning when a single bubble is used. In an embodiment including two bubbles, when the first bubble 80 passes a corresponding line 30a of scanning in the fluid pipe 30, the second bubble 83 passes a line 30b opposite to the corresponding line of scanning 30a. For example, when the first bubble 80 arrives at a scanning start point sp, the second bubble 83 is positioned at a corner exactly half way around the fluid pipe 30 from the first bubble 80, so that the second bubble 83 moves along the opposite line 30b while the first bubble 80 moves along the corresponding line of scanning 30a of the fluid pipe 30. By using two bubbles, scanning intervals can also be adjusted.

The position detecting sensor 60 and the speed sensor 75, shown in FIG. 5, function in the same manners as those of FIG. 2. With such an arrangement, the scanning speed can be increased.

As described above, the present invention performs scanning by focusing a beam scattered by a bubble which moves within a closed loop fluid pipe, and forming an image so that the size of an optical scanning apparatus can be reduced, and the optical scanning apparatus can be easily manufactured. Therefore, productivity is improved, and costs are reduced.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An optical scanning apparatus, comprising:
   a light source to emit light;
   a fluid pipe containing a fluid to transmit the light emitted from the light source;
   a bubble contained in the fluid pipe, to scatter the transmitted light;

a pump to circulate the bubble at a predetermined speed; and an image formation lens to focus the light scattered by the bubble to form an image on a medium along a predetermined scanning line.

2. The optical scanning apparatus of claim 1, wherein the surface of the bubble facing the light source is spherical, and the overall shape of the bubble is a sphere to scatter incident light at a predetermined angle.

3. The optical scanning apparatus of claim 2, wherein the bubble contacts the sidewall of the fluid pipe to minimize deformation of the bubble while the bubble moves in the fluid pipe.

4. The optical scanning apparatus of claim 2, further comprising:

a position detecting sensor to detect a position of the bubble; and a controller to control the emitting of light by the light source based upon the detected position of the bubble.

5. The optical scanning apparatus of claim 2, wherein a length of a line corresponding to a point from which scanning starts in the fluid pipe to a point at which the scanning ends is represented by d, the length of the scanning line is represented by D, and the power of the image formation lens is represented by a, such that d satisfies:

$$d = \frac{D}{a}.$$

6. The optical scanning apparatus of claim 2, wherein the pump comprises a controller to maintain the predetermined speed of the bubble based on a speed of the bubble.

7. The optical scanning apparatus of claim 6, further comprising a speed sensor detecting the speed of the bubble.

8. The optical scanning apparatus of claim 1, wherein the bubble contacts the sidewall of the fluid pipe to minimize deformation of the bubble while the bubble moves in the fluid pipe.

9. The optical scanning apparatus of claim 1, further comprising a controller to control the emitting of light by the light source based upon a position of the bubble determined by a position detecting sensor.

10. The optical scanning apparatus of claim 1, wherein a length of a line corresponding to a point from which scanning starts in the fluid pipe to a point at which the scanning ends is represented by d, the length of the scanning line is represented by D, and the power of the image formation lens is represented by a, such that d satisfies:

$$d = \frac{D}{a}.$$

11. The optical scanning apparatus of claim 1, further comprising a controller to maintain a predetermined speed of the bubble based on a speed of the bubble as detected by a speed sensor.

12. The optical scanning apparatus of claim 1, further comprising a collimating lens to convert incident light into parallel light and a cylindrical lens to shape the parallel light transmitted by the collimating lens, in an optical path between the light source and the fluid pipe.

13. The optical scanning apparatus of claim 1, wherein the surface of the bubble facing the light source is spherical, and the overall shape of the bubble is an oblong sphere to scatter incident light at a predetermined angle.

14. The optical scanning apparatus of claim 1, further comprising a controller to control the movement of the bubble and at least one additional bubble in the fluid pipe.

15. An optical scanning method, comprising:

circulating a bubble through a linear path;

focusing light on the bubble circulating in the linear path, to scatter the light; and focusing the light scattered by the bubble onto a medium along a predetermined scanning line.

16. The optical scanning method of claim 15, wherein the circulating of the bubble further comprises circulating a fluid surrounding the bubble in a pipe.

17. The optical scanning method of claim 15, wherein the focusing light on the bubble further comprises converting light from a light source into parallel light and shaping the parallel light to focus on the bubble.

18. The optical scanning method of claim 15, wherein a surface of the bubble is spherical.

19. The optical scanning method of claim 15, further comprising maintaining the speed of the bubble at a predetermined speed.

20. The optical scanning method of claim 15, further comprising controlling the emitting of a light by a light source based upon a position of the bubble, wherein the light emitted by the light source is then focused by the focusing of light on the bubble circulating in the linear path.

21. The optical scanning method of claim 15, further comprising determining a time to begin a scanning operation based upon a position of the bubble.

22. The optical scanning method of claim 15, wherein a length of a line corresponding to a point from which a scanning operation starts in the linear path to a point at which the scanning ends is represented by d, the length of the predetermined scanning line is represented by D, and the power of the light focused onto the circulating bubble is represented by a, such that d satisfies:

$$d = \frac{D}{a}.$$

23. An optical scanning apparatus, comprising:

a light source to generate an incident light;

a pipe;

a bubble contained in the pipe, to scatter the incident light;

a pump to circulate the bubble at a predetermined speed through the pipe; and an image formation lens to focus the light scattered by the bubble to a medium along a predetermined scanning line.

24. An optical scanning apparatus, comprising:

a light source emitting a light;

a pipe circulating a bubble at a substantially constant speed, wherein the bubble scatters the light; and a photosensitive medium receiving the scattered light along a scan line, to form an image.

25. The optical scanning apparatus of claim 24, wherein the pipe has a linear portion through which the bubble passes from a beginning to an end of the scan line.

26. The optical scanning apparatus of claim 24, wherein the pipe further comprises a fluid in which the bubble is contained.

* * * * *